(12) United States Patent
Deroover

(10) Patent No.: US 8,435,341 B2
(45) Date of Patent: May 7, 2013

(54) PREPARING AND DISPERSING SURFACE-MODIFIED COLOUR PIGMENTS

(75) Inventor: Geert Deroover, Lier (BE)

(73) Assignee: AGFA-Gevaert N.V., Mortsel (BE)

( * ) Notice: Subject to any disclaimer, the term of this patent is extended or adjusted under 35 U.S.C. 154(b) by 0 days.

(21) Appl. No.: 13/501,281

(22) PCT Filed: Oct. 20, 2010

(86) PCT No.: PCT/EP2010/065759
§ 371 (c)(1),
(2), (4) Date: Apr. 11, 2012

(87) PCT Pub. No.: WO2011/054667
PCT Pub. Date: May 12, 2011

(65) Prior Publication Data
US 2012/0199044 A1    Aug. 9, 2012

Related U.S. Application Data

(60) Provisional application No. 61/259,666, filed on Nov. 10, 2009.

(30) Foreign Application Priority Data

Nov. 3, 2009  (EP) .................................. 09174938

(51) Int. Cl.
*C09B 67/20* (2006.01)
*C09B 67/14* (2006.01)
*C09B 67/22* (2006.01)
*C09B 67/46* (2006.01)

(52) U.S. Cl.
USPC ........... 106/493; 106/494; 106/495; 106/496; 106/497; 106/498; 546/49; 546/56; 548/453

(58) Field of Classification Search .................. 106/493, 106/494, 495, 496, 497, 498; 546/49, 56; 548/453
See application file for complete search history.

(56) References Cited

U.S. PATENT DOCUMENTS

| 6,152,968 A | 11/2000 | Etzbach et al. |
| 2003/0134938 A1 | 7/2003 | Nakamura et al. |
| 2004/0171014 A1 | 9/2004 | Smith |
| 2006/0185558 A1 | 8/2006 | Saikatsu et al. |

FOREIGN PATENT DOCUMENTS

| EP | 1 790 695 A1 | 5/2007 |
| EP | 1 790 698 A1 | 5/2007 |
| WO | 2005/040284 A1 | 5/2005 |
| WO | 2007/060254 A2 | 5/2007 |
| WO | WO2007060254 A2 * | 5/2007 |
| WO | WO2007060257 A2 * | 5/2007 |
| WO | WO2007060258 A2 * | 5/2007 |
| WO | WO2007060265 A2 * | 5/2007 |
| WO | WO2007060266 A2 * | 5/2007 |
| WO | 2008/034472 A1 | 3/2008 |

OTHER PUBLICATIONS

Official Communication issued in International Patent Application No. PCT/EP2010/065759, mailed on Feb. 1, 2011.

* cited by examiner

*Primary Examiner* — Anthony J Green
(74) *Attorney, Agent, or Firm* — Keating & Bennett, LLP

(57) ABSTRACT

A method of preparing a pigment includes in order the steps of: a) providing a pigment containing a nucleophile group under basic conditions; b) reacting the pigment with 1,4-butane sultone or 1,3-propane sultone in an alkaline medium to form sulfobutyl groups respectively sulfopropyl groups on the pigment surface; and c) adding acid to convert the sulfobutyl groups or sulfopropyl groups to sulfonic acid groups. Pigments obtainable by the method and non aqueous pigment dispersions are also disclosed.

8 Claims, No Drawings

PREPARING AND DISPERSING SURFACE-MODIFIED COLOUR PIGMENTS

CROSS-REFERENCE TO RELATED APPLICATIONS

This application is a 371 National Stage Application of PCT/EP2010/065759, filed Oct. 20, 2010. This application claims the benefit of U.S. Provisional Application No. 61/259,666, filed Nov. 10, 2009, which is incorporated by reference herein in its entirety. In addition, this application claims the benefit of European Application No. 09174938.2, filed Nov. 3, 2009, which is also incorporated by reference herein in its entirety.

BACKGROUND OF THE INVENTION

1. Field of the Invention

The present invention relates to surface modified-colour pigments and methods for preparing them. The present invention also relates to non-aqueous pigment dispersions made with these pigments.

2. Description of the Related Art

Polymeric dispersants are substances for promoting the formation and stabilization of a dispersion of pigment particles in a dispersion medium. They typically contain in one part of the molecule so-called anchor groups, which adsorb onto the pigments to be dispersed. In a spatially separate part of the molecule, polymeric dispersants have polymer chains compatible with the dispersion medium, thus stabilizing the pigment particles in the dispersion medium.

In aqueous pigment dispersions, the polymeric dispersants generally contain hydrophobic anchor groups exhibiting a high affinity for the pigment surface and hydrophilic polymer chains for stabilizing the pigments in the aqueous dispersion medium.

Thermally stable non-aqueous dispersions with submicron particles are much more difficult to prepare, especially for pigments having a non-polar surface. Particularly high requirements are set when manufacturing solvent based, oil based and radiation curable inkjet inks. Inadequate dispersing manifests itself as increased viscosity in liquid systems, loss of brilliance and/or hue shifts. Moreover, particularly good dispersion of the pigment particles is required to ensure unimpeded passage of pigment particles through the nozzles of a print head, which are usually only a few micrometers in diameter. In addition, pigment particle agglomeration and the associated blockage of the printer nozzles has to be avoided in the standby periods of the printer.

One approach to disperse pigments with a hydrophobic surface in a non-aqueous dispersion medium is by modifying the pigment surface to a hydrophilic surface by addition of so-called dispersion synergists. WO 2007/060254 (AGFA GRAPHICS) discloses quinacridone derivatives having carboxylic acid groups for modifying the surface of quinacridone pigment so that non-aqueous pigment dispersions exhibiting high dispersion quality can be prepared. Sulfonated quinacridone synergists are disclosed as comparative examples (SYN-1 to SYN-3), but however fail to improve the dispersion stability of quinacridone pigments.

Sulfonated quinacridone derivatives have also been disclosed in, for example U.S. Pat. No. 6,152,968 (BASF), which is however silent on their use in non-aqueous media.

In another approach, the pigment surface is modified by direct chemical reaction. WO 2008/034472 (AGFA GRAPHICS) discloses a surface modification of several yellow pigments by hydrolyzing their methyl ester groups though the addition of sulphuric acid.

US 2003134938 (DAINICHISEIKA) discloses a process producing a sulfonated solid particle by burning sulphur to yield gaseous sulphur dioxide, subjecting the gaseous sulphur dioxide to catalytic oxidation to yield gaseous sulphur trioxide, and sulfonating a dry powdery or granular solid particle with the gaseous sulphur trioxide in a gas phase-solid phase reaction. The pigments in Table 1 include the quinacridone pigment C.I. Pigment Violet 19. Sulphur dioxide and sulphur trioxide are highly toxic compounds which can also cause chemical burn on the skin of operators. From viewpoints of workability and safety, their use is to be avoided. Also from an environmental perspective sulphur dioxide is to be avoided since it results in acid rain damaging forests and crops.

For consistent image quality, inkjet inks require a dispersion stability capable of dealing with high temperatures (above 60° C.) during transport of the ink to a customer, jetting at elevated temperatures and changes in the dispersion medium of the inkjet ink during use, for example, evaporation of solvent and increasing concentrations of humectants, penetrants and other additives.

Therefore, it is highly desirable to manufacture in a cost effective way non-aqueous pigment dispersions exhibiting high dispersion quality and stability.

SUMMARY OF INVENTION

In order to overcome the problems described above, it has been found that a pigment surface could be modified in situ by a two step chemical process, which resulted in pigments exhibiting surprisingly better dispersion stability than if the same compound was deposited as a dispersion synergist on the pigment surface. It is believed that the reason for this effect may be that the in-situ chemical modification also modifies pigment molecules present in the middle of a pigment surface which are not susceptible to a balance of adsorption and desorption. It is believed that sulfonated dispersion synergists deposited on kink-sites and edges of a pigment surface are much more susceptible to desorption. Furthermore, the presence of a small spacer, such as butyl, between the sulfonic acid group and the pigment surface facilitates the interaction between a polymeric dispersant and the sulfonic acid group.

A preferred embodiment of the present invention provides a method of preparing a pigment in a cost effective way as defined below.

Further preferred embodiments of the present invention provide non-aqueous pigment dispersions, especially with non-aqueous inkjet inks, exhibiting high dispersion stability.

The above and other elements, features, steps, characteristics and advantages of the present invention will become more apparent from the following detailed description of the preferred embodiments.

DETAILED DESCRIPTION OF THE PREFERRED EMBODIMENTS

Definitions

The term "in-situ surface modified pigment" is used in the present invention for a pigment which pigment surface has been modified by chemical reaction rather than by deposition of a dispersion synergist.

The term "mixed crystal", which is synonymous for "solid solution", as used in disclosing the present invention, means a solid, homogeneous mixture of two or more constituents, which may vary in composition between certain limits and remain homogeneous. Mixed crystals are also referred to as solid solutions. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Methods of Preparation

A method of preparing a pigment according to a preferred embodiment of the present invention comprises in order the steps of:
a) providing a pigment containing a nucleophile group under basic conditions;
b) reacting the pigment with 1,4-butane sultone or 1,3-propane sultone in an alkaline medium to form sulfobutyl groups respectively sulfopropyl groups on the pigment surface; and
c) adding acid to convert the sulfobutyl groups or sulfopropyl groups to sulfonic acid groups.

In a preferred embodiment of preparing a pigment according to the present invention, the acid is hydrochloric acid.

In a more preferred embodiment, 1,4-butane sultone is used in an alkaline medium to form sulfobutyl groups on the pigment surface, because 1,4-butane sultone is less toxic than 1,3-propane sultone.

Pigment

A pigment according to a preferred embodiment of the present invention is a pigment obtainable from an in-situ chemical reaction from a pigment containing a nucleophile group under basic conditions. The nucleophile group under basic conditions is preferably selected from the group consisting of an amine group, an amide group and a vinylogous amide group.

The pigment containing a nucleophile group under basic conditions is preferably a quinacridone pigment. The quinacridone pigment is preferably selected of the group consisting of C.I. Pigment Violet 19, C.I. Pigment Red 122, C.I. Pigment Red 192, C.I. Pigment Red 202, C.I. Pigment Red 207 and C.I. Pigment Red 209.

In a preferred embodiment the pigment containing a nucleophile group under basic conditions is a mixed crystal of two or more quinacridones. A preferred mixed crystal contains C.I. Pigment Violet 19 and C.I. Pigment Red 202.

In a preferred embodiment the pigment containing a nucleophile group is a mixed crystal of two or more quinacridones. A preferred mixed crystal contains C.I. Pigment Violet 19 and C.I. Pigment Red 202.

The pigment containing a nucleophile group may also preferably be a diketopyrrolo-pyrrole pigment. The diketopyrrolo-pyrrole pigment is preferably selected from the group consisting of C.I. Pigment Orange 71, C.I. Pigment Orange 73, C.I. Pigment Orange 81, C.I. Pigment Red 254, C.I. Pigment Red 255, C.I. Pigment Red 264, C.I. Pigment Red 270, C.I. Pigment Red 272 and mixed crystals thereof.

In a preferred embodiment, the obtained pigment contains at least 2 mol % of sulfonic acid groups based on the pigment.

Non-Aqueous Pigment Dispersions and Inks

The non-aqueous pigment dispersion according to a preferred embodiment of the present invention includes a non-aqueous dispersion medium, a polymeric dispersant and at least one pigment.

In a preferred embodiment, the non-aqueous pigment dispersion is curable by UV radiation or e-beam.

In a preferred embodiment, the non-aqueous pigment dispersion is an inkjet ink, more preferably an inkjet ink curable by UV radiation or e-beam.

The non-aqueous pigmented dispersion according to a preferred embodiment of the present invention may further also contain at least one surfactant to control the homogenous spreading of the pigment dispersion on a substrate. For a non-aqueous pigmented inkjet ink, the surfactant is important to control the dot size of the ink droplet on a substrate.

In a preferred embodiment the non-aqueous pigmented dispersion is a non-aqueous inkjet ink containing at least one humectant to prevent the clogging of the nozzle, due to its ability to slow down the evaporation rate of ink.

The viscosity of an inkjet ink is preferably lower than 30 mPa·s, more preferably lower than 15 mPa·s, and most preferably between 2 and 10 mPa·s at a shear rate of $100\ s^{-1}$ and a jetting temperature between 10 and 70° C.

The non-aqueous inkjet ink forms preferably part of a non-aqueous CMYK inkjet ink set. The non-aqueous CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess.

The pigments are preferably present in the range of 0.05 to 20%, more preferably in the range of 0.1 to 10% by weight and most preferably in the range of 1 to 6% by weight, each based on the total weight of the pigment dispersion or inkjet ink.

Non-Aqueous Dispersion Media

The dispersion medium used in the pigment dispersion according to a preferred embodiment of the present invention is a non-aqueous liquid. The dispersion medium may consist of organic solvent(s).

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable examples of organic solvents are disclosed in [0133] to [0146] of EP 1857510 A (AGFA GRAPHICS).

If the pigment dispersion is a curable pigment dispersion or inkjet ink, organic solvent(s) are preferably fully replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the pigmented inkjet ink and most preferably the curable pigment dispersion doesn't include any organic solvent.

For oil based pigment dispersions and inkjet inks the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cycloparaffins (cyclooctane and higher cyclo-alkanes) and mixtures of paraffin oils.

Suitable examples of oils are disclosed in [0151] to [0164] of EP 1857510 A (AGFA GRAPHICS).

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310,115 (AGFA), incorporated herein by reference. Particularly preferred compounds are 2-(2-vinyloxyethoxy)ethyl (meth)acrylate, most preferably the compound is 2-(2-vinyloxyethoxy)ethyl acrylate.

Polymeric Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH. Particularly preferred dispersants are SOLSPERSE™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Photoinitiators

If the pigment dispersion or ink is radiation curable, preferably one or more photoinitiators are present in the pigment dispersion or ink.

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in preferred embodiments of the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy- 6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photo-initiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, most preferably 0.3-15 wt % of the total weight of the curable pigment dispersion or ink.

In order to increase the photosensitivity further, the curable pigment dispersion or ink may additionally contain co-initiators. Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino) benzoate; and
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate).

The preferred co-initiators are aminobenzoates.

When one or more co-initiators are included into the curable pigment dispersion or ink according to a preferred embodiment of the present invention, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The curable pigment dispersion or ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The curable pigment dispersion may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, 5110, 5120 and 5130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total pigment dispersion or ink.

Binders

Non-aqueous pigment dispersions based on organic solvents or oils preferably include a binder resin. The binder functions as a viscosity controlling agent and also provides fixability relative to the polymeric resin substrate, e.g. a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in a pigment dispersion or ink is preferably in the range of 0.1 to 30 wt %, more preferably 1 to 20 wt %, most preferably 2 to 10 wt % based on the total weight of the pigment dispersion or ink.

Surfactants

The pigment dispersion or ink may contain at least one surfactant. The surfactant(s) can be anionic, cationic, non-ionic, or zwitter-ionic and are usually added in a total quantity less than 20 wt % based on the total weight of the inkjet ink and particularly in a total less than 10 wt % based on the total weight of the pigment dispersion or ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound as disclosed above may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol.

The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Spectral Separation Factor

The spectral separation factor SSF was found to be an excellent measure to characterize a pigmented inkjet ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $\lambda_{max}$ over the absorbance $\lambda_{ref}$ at a reference wavelength.

$$SSF = \frac{A_{max}}{A_{ref}}$$

The SSF is an excellent tool to design inkjet ink sets with large colour gamut. Often inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these inkjet ink sets is low or mediocre.

EXAMPLES

Materials

All materials used in the following examples were readily available from standard sources such as ALDRICH CHEMICAL Co. (Belgium) and ACROS (Belgium) unless otherwise specified. The water used was deionized water.

PV19 is the abbreviation for C.I. Pigment Violet 19 for which HOSTAPERM RED™ E5B02 from CLARIANT was used.

PR202 is the abbreviation for C.I. Pigment Red 202 for which CINQUASIA MAG RT235D from CIBA SPECIALTY CHEMICALS was used.

PV19/PR202 is the abbreviation for a mixed crystal of C.I. Pigment Violet 19 and C.I. Pigment Red 202 for which Chromophtal™ Jet Magenta 2BC from CIBA SPECIALTY CHEMICALS was used.

SOLSPERSE™ 39000 a solid polyethyleneimine core grafted with polyester hyperdispersant from LUBRIZOL.

DEGDEE is diethylene glycol diethyl ether.

DS-1 is dispersion synergist according to Formula DS-1:

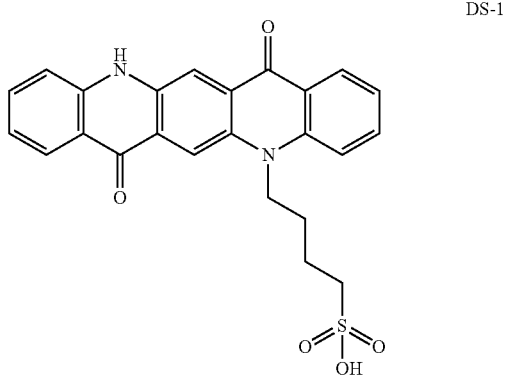 [SMILES: O=c1c2ccccc2[nH]c2cc3c(=O)c4ccccc4n(CCCCS(=O)(=O)O)c3cc12]

The dispersion synergist DS-1 was made according to the following synthesis method:

156 g of the pigment PV19 and 112 g of potassium tert-butoxide were mixed and heated in 1000 mL dimethylsulfoxide to about 80° C. for 1 hour. 68.35 g of 1,4-butanesultone and 8.2 g of potassium iodide were added to the solution and the mixture was stirred for 24 hours at 60° C. After cooling down to 20° C., the dispersion synergist DS-1 was precipitated by adding 500 mL of aceton. The synergist was filtered and washed with aceton. After drying at 60° C., 58 g of DS-1 was recovered.

DS-2 is Dispersion Synergist According to Formula DS-2:

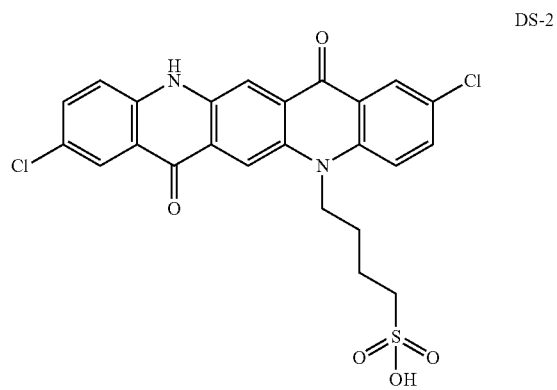 [SMILES: O=c1c2cc(Cl)ccc2[nH]c2cc3c(=O)c4cc(Cl)ccc4n(CCCCS(=O)(=O)O)c3cc12]

The dispersion synergist DS-2 was made according to the following synthesis method:

152.4 g of the pigment PR202 and 89.6 g of potassium tert-butoxide were mixed and heated in 1000 mL dimethylsulfoxide to about 80° C. for 1 hour. 54.7 g of 1,4-butanesultone and 6.6 g of potassium iodide were added to the solution and the mixture was stirred for 24 hours at 60° C. After cooling down to 20° C., the dispersion synergist DS-2 was precipitated by adding 1000 mL of aceton. The synergist was filtered and washed with aceton. After drying at 60° C., 140 g of DS-2 was recovered.

Measurement Methods

1. Measurement of SSF

The spectral separation factor SSF of the ink was calculated by using the data of the recorded spectrum of an ink solution and comparing the maximum absorbance to the absorbance at a reference wavelength. The absorbance $\lambda_{ref}$ was determined at a reference wavelength of 650 nm.

The absorbance was determined in transmission with a Shimadzu UV-2101 PC double beam-spectrophotometer. The inks were diluted with ethyl acetate to have a pigment concentration of 0.005 wt % based on the total weight of the ink.

A spectrophotometric measurement of the UV-VIS-NIR absorption spectrum of the diluted ink was performed in transmission-mode with a double beam-spectrophotometer using the settings of Table 1. Quartz cells with a path length of 10 mm were used and ethyl acetate was chosen as a blank.

TABLE 1

| Mode | Absorbance |
| --- | --- |
| Wavelength range | 240-900 nm |
| Slit width | 2.0 nm |
| Scan interval | 1.0 nm |
| Scan speed | Fast (1165 nm/min) |
| Detector | photo-multiplier(UV-VIS) |

Efficient pigmented inkjet inks exhibiting a narrow absorption spectrum and a high maximum absorbance have a value for SSF of at least 30, more preferably at least 60.

2. Pigment Dispersion Stability

The dispersion stability was evaluated by comparing the SSF before and after a heat treatment of one week at 80° C. Pigmented inkjet inks exhibiting good dispersion stability have a SSF after heat treatment still larger than 30 and a loss in SSF of less than 35%, more preferably less than 10%.

3. Average Particle Size

The particle size of pigment particles in pigmented inkjet ink was determined by photon correlation spectroscopy at a wavelength of 633 nm with a 4 mW HeNe laser on a diluted sample of the pigmented inkjet ink. The particle size analyzer used was a MALVERN™ nano-S available from Goffin-Meyvis.

The sample was prepared by addition of one drop of ink to a cuvette containing 1.5 mL ethyl acetate and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is below 200 nm, preferably between 70 and 150 nm. The pigmented inkjet ink was considered to be a stable pigment dispersion if the particle size did not increase much and remained below 200 nm after a heat treatment of 7 days at 80° C.

Example 1

This example illustrates the method of preparing a pigment according to a preferred embodiment of the present invention.

Preparation of Pigment PS-1

15.2 g of PV19/PR202 was mixed with 0.75 g of potassium t-butylate in 90 mL of aceto nitrile for 30 minutes at 60° C. After 0.82 g of 1,4-butanesultone and 0.2 g of sodium iodide were added, the mixture was stirred for 16 hours at 70° C. 20 mL of concentrated HCl was added to the mixture which was stirred for another hour. The mixture was cooled to 20° C. and then filtered and washed with MeOH and water. The residue was dried at 50° C. in an oven. 11.0 g of pigment PS-1 was obtained.

Example 2

This example illustrates the advantages on dispersion quality and stability of the surface modified pigments in inkjet inks according to a preferred embodiment of the present invention.

Preparation of Inkjet Inks

All inkjet inks were prepared in the same manner to obtain a composition as described in Table 2.

TABLE 2

| wt % of Component | COMP-1 | COMP-2 | COMP-3 | INV-1 |
| --- | --- | --- | --- | --- |
| Pigment PV19/PR202 | 5.00 | 4.50 | 4.50 | — |
| Pigment PS-1 | — | — | — | 5.00 |
| Dispersion synergist DS-1 | — | 0.50 | — | — |
| Dispersion synergist DS-2 | — | — | 0.50 | — |
| SOLSPERSE ™ 39000 | 5.00 | 5.00 | 5.00 | 5.00 |
| DEGDEE | 90.00 | 90.00 | 90.00 | 90.00 |

A pigment dispersion was made by mixing the pigment, the polymeric dispersant and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

Evaluation of Inkjet Inks

The average particle size and the spectral separation factor SSF were determined to evaluate the dispersion quality and were determined again after a heat treatment of 1 week at 80° C. The results are listed in Table 3.

TABLE 3

| | Dispersion quality | | Dispersion stability after 1 week at 80° C. | |
| --- | --- | --- | --- | --- |
| Inkjet ink | SSF | Average particle size | % Loss in SSF | % increase in average particle size |
| COMP-1 | 76 | 102 nm | 55% | 164% |
| COMP-2 | 100 | 88 nm | 0% | 27% |
| COMP-3 | 100 | 83 nm | 18% | 0% |
| INV-1 | 76 | 77 nm | 0% | 0% |

From Table 3, it should be clear that although a good dispersion quality can be obtained with all inkjet inks, only the inkjet ink INV-1 with the in-situ surface modified pigment exhibits excellent dispersion stability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of preparing a pigment comprising, in order, the steps of:
   providing a pigment containing a nucleophile group under basic conditions;
   reacting the pigment with 1,4-butane sultone or 1,3-propane sultone in an alkaline medium to form sulfobutyl groups or sulfopropyl groups, respectively, on a surface of the pigment; and
   adding acid to convert the sulfobutyl groups or the sulfopropyl groups to sulfonic acid groups; wherein
   the nucleophile group under basic conditions is selected from the group consisting of an amine group, an amide group, and a vinylogous amide group.

2. The method according to claim 1, wherein the acid is hydrochloric acid.

3. The method according to claim 1, wherein the pigment is a quinacridone pigment.

4. The method according to claim 3, wherein the quinacridone pigment is selected from the group consisting of C.I. Pigment Violet 19, C.I. Pigment Red 122, C.I. Pigment Red 192, C.I. Pigment Red 202, C.I. Pigment Red 207, and C.I. Pigment Red 209.

5. The method according to claim 3, wherein the quinacridone pigment is a mixed crystal of two or more quinacridones.

6. The method according to claim 5, wherein the quinacridone pigment is a mixed crystal containing C.I. Pigment Violet 19 and C.I. Pigment Red 202.

7. The method according to claim 1, wherein the pigment is a diketopyrrolo-pyrrole pigment.

8. The method according to claim 7, wherein the diketopyrrolo-pyrrole pigment is selected from the group consisting of C.I. Pigment Orange 71, C.I. Pigment Orange 73, C.I. Pigment Orange 81, C.I. Pigment Red 254, C.I. Pigment Red 255, C.I. Pigment Red 264, C.I. Pigment Red 270, C.I. Pigment Red 272, and mixed crystals thereof.

\* \* \* \* \*